(12) United States Patent
Jones et al.

(10) Patent No.: US 9,125,058 B2
(45) Date of Patent: *Sep. 1, 2015

(54) METHOD AND SYSTEM FOR SELECTING VPN CONNECTIONS IN RESPONSE TO WIRELESS NETWORK IDENTIFIERS

(75) Inventors: Bryce A. Jones, Overland Park, KS (US); Jason Delker, Olathe, KS (US); John M. Everson, Leawood, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 691 days.

This patent is subject to a terminal disclaimer.

(21) Appl. No.: 13/270,635

(22) Filed: Oct. 11, 2011

(65) Prior Publication Data
US 2012/0027002 A1 Feb. 2, 2012

Related U.S. Application Data

(63) Continuation of application No. 12/497,204, filed on Jul. 2, 2009, now Pat. No. 8,077,689, which is a continuation of application No. 10/327,427, filed on Dec. 20, 2002, now Pat. No. 7,633,909.

(51) Int. Cl.
*H04W 4/00* (2009.01)
*H04W 12/08* (2009.01)
*H04L 29/06* (2006.01)
*H04W 88/08* (2009.01)

(52) U.S. Cl.
CPC ............ *H04W 12/08* (2013.01); *H04L 63/0272* (2013.01); *H04W 88/085* (2013.01)

(58) Field of Classification Search
USPC ......... 370/357–360, 363–364, 395.3–395.32, 370/400–402, 419–421, 328–329, 338; 455/410–411, 450–451, 554.2–557
See application file for complete search history.

(56) References Cited

U.S. PATENT DOCUMENTS

| | | | |
|---|---|---|---|
| 6,055,575 | A | 4/2000 | Paulsen et al. |
| 6,594,246 | B1 | 7/2003 | Jorgensen |
| 6,711,678 | B2 | 3/2004 | Ferguson |
| 6,765,881 | B1 | 7/2004 | Rajakarunanayake |
| 6,795,701 | B1 | 9/2004 | Baker et al. |
| 6,950,628 | B1 | 9/2005 | Meier et al. |
| 6,970,459 | B1 | 11/2005 | Meier |
| 7,020,084 | B1 | 3/2006 | Tanaka et al. |
| 7,062,566 | B2 | 6/2006 | Amara et al. |

(Continued)

FOREIGN PATENT DOCUMENTS

WO   WO 2006/118530   11/2006

OTHER PUBLICATIONS

Sprint Wholesale: Products: Voice: Voice VPN, http://www.sprintbiz.com/wholesale/products/vpn.html, printed from the World Wide Web on Oct. 2, 2002.

(Continued)

*Primary Examiner* — Thai Hoang

(57) ABSTRACT

A method and system for providing connections from a wireless access point. The wireless access point has multiple VPN tunnels. The access point detects a wireless-network identifier (such as a service set identifier (SSID)) provided by a terminal via an air interface, and the access point uses the wireless-network identifier as a basis to select one of the VPN tunnels. The access point then sends communication from the terminal via the selected VPN tunnel.

17 Claims, 10 Drawing Sheets

(56) References Cited

U.S. PATENT DOCUMENTS

| | | | |
|---|---|---|---|
| 7,069,433 | B1 | 6/2006 | Henry et al. |
| 7,117,526 | B1 * | 10/2006 | Short .................................. 726/5 |
| 7,251,218 | B2 | 7/2007 | Jorgensen |
| 7,277,547 | B1 | 10/2007 | Delker et al. |
| 7,298,702 | B1 | 11/2007 | Jones et al. |
| 7,349,412 | B1 | 3/2008 | Jones et al. |
| 7,388,844 | B1 | 6/2008 | Brown et al. |
| 7,633,909 | B1 * | 12/2009 | Jones et al. .................. 370/338 |
| 8,077,689 | B1 * | 12/2011 | Jones et al. .................. 370/338 |
| 2001/0055283 | A1 | 12/2001 | Beach |
| 2002/0191635 | A1 | 12/2002 | Chow et al. |
| 2003/0087629 | A1 | 5/2003 | Juitt et al. |
| 2003/0152068 | A1 | 8/2003 | Balasaygun et al. |
| 2004/0003060 | A1 | 1/2004 | Asoh et al. |
| 2004/0122956 | A1 | 6/2004 | Myers et al. |
| 2004/0198220 | A1 * | 10/2004 | Whelan et al. ............... 455/41.1 |

OTHER PUBLICATIONS

Broadsoft: Enterprise Networking, Enterprise Voice Networking (Voice VPN), http://www.broadsoft.com/products/applications/enterprise_networking.html, printed from the World Wide Web on Oct. 2, 2002.

Colubris Networks, Wireless LAN Router, CN100, CN1000, CN1050, CN1054, printed from the World Wide Web on Oct. 2, 2002.

SMC Networks Consumer Site: Products: SMC7004WFW—Barricade™ Plus Wireless Cable/DSL Broadband Router, http://www.smc.com/index.cfm?sec=Products&pg=Product-Details&prod=253&site=c, printed from the World Wide Web on Oct. 7, 2002.

Network World Fusion, Colubris CN1050 wireless LAN router, http://www.nwfusion.com/reviews/2002/0415rev2.html, printed from the World Wide Web on Oct. 7, 2002.

Colubris Networks, CN1054 Wireless LAN router, 2001.

Trudeau, "Building Secure Wireless Local Area Networks," A White Paper by Colubris Networks Inc., 2001.

Network World Fusion, How is VoIP over a wireless LAN?, http://www.nwfusion.com/newsletters/converg/2002/01539349.html, printed from the World Wide Web on Oct. 15, 2002.

Network World Fusion, ReefEdge Connect System 3.0 targets WLAN security, http://www.nwfusion.com/news12002/0909reef.html, printed from the World Wide Web on Oct. 15, 2002.

Network World Fusion, Avaya to meld VPNs and VoIP, http://www.nwfusion.com/news/2002/129521_01-28/2002.html, printed from the World Wide Web on Oct. 15, 2002.

i-data International, Copenhagen Stock Exchange Message 36/2000, Nov. 1, 2000.

Network World Fusion, Adding voice to VPNs, http://www.nwfusion.com/news/2002/0603vpn.html, printed from the World Wide Web on Oct. 15, 2002.

Network World Fusion, Firewall limits vex VoIP users, http://www.nwfusion.com/news/2002/0708voip.html, printed from the World Wide Web on Oct. 15, 2002.

Snom technology AG—Voice over IP (VoIP) Phones:: Products:: Technology:: STUN, http://www.snomag.de/stun_en.htm, printed from the World Wide Web on Oct. 15, 2002.

* cited by examiner

METHOD AND SYSTEM FOR SELECTING VPN CONNECTIONS IN RESPONSE TO WIRELESS NETWORK IDENTIFIERS

REFERENCE TO RELATED APPLICATIONS

This is a continuation of U.S. patent application Ser. No. 12/497,204, filed Jul. 2, 2009, which is a continuation of U.S. patent application Ser. No. 10/327,427, filed Dec. 20, 2002, which issued as U.S. Pat. No. 7,633,909. The entirety of these priority applications are hereby incorporated by reference in their entirety.

This disclosure is also related to U.S. Pat. Nos. 7,298,702 and 7,349,412. The entirety of the applications leading to those issued patents are hereby incorporated by reference in their entirety as well.

BACKGROUND

1. Field of the Invention

The present invention relates to telecommunications, and more particularly to a method and system for providing multiple connections from a common access point in a wireless local area network.

2. Description of Related Art

In recent years, wireless local area networking has become increasingly popular. Provided with a suitable wireless communication device, a user operating in a wireless local area network (WLAN) can conveniently gain access to network resources without being tethered to a fixed location.

A WLAN can take various forms, one of the most common of which is that described by industry standard IEEE 802.11 (as modified by 802.11b and 802.11a or other 802.11-variants). Applicable details of 802.11 are well known to those of ordinary skill in the art. Other examples of WLAN technology include Bluetooth and HomeRF. And still other examples are now known or will be developed in the future.

Generally speaking, in an 802.11 WLAN (by way of example), one or more access points (APs) are provided as base stations to interface between wireless terminals and a distribution system (e.g., a wired Ethernet or other system). When a wireless terminal first enters an 802.11 WLAN, the wireless terminal becomes associated with a nearby AP and becomes authenticated for purposes of communicating within the WLAN. Depending on the scope of authentication, the wireless terminal may then be able to communicate with other wireless terminals operating on the WLAN and/or with various servers or other entities in the distribution system. Further, the distribution system may provide connectivity with another network such as the Internet for instance. Therefore, the wireless terminal might be able to access resources on that other network as well.

OVERVIEW

Disclosed herein is an access point that establishes a virtual private network (VPN) tunnel to a remote VPN endpoint in response to the access point receiving a particular wireless-network identifier, such as a particular SSID, from a wireless terminal. Further disclosed is a corresponding method.

The access point may include data storage that contains multiple sets of VPN security settings, so that the access point can readily establish VPN tunnels. The access point may further include logic that causes a processor of the access point to establish a VPN tunnel in response to a wireless terminal associating with the access point, such as when the access terminal sends an access request to the access point. The SSID used by the wireless terminal could correlate with a particular set of the VPN security settings, so the processor could use that particular set to establish a VPN tunnel to carry communications from that wireless terminal to a remote network.

These as well as other aspects and advantages will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

1. Overview

Figure 1:
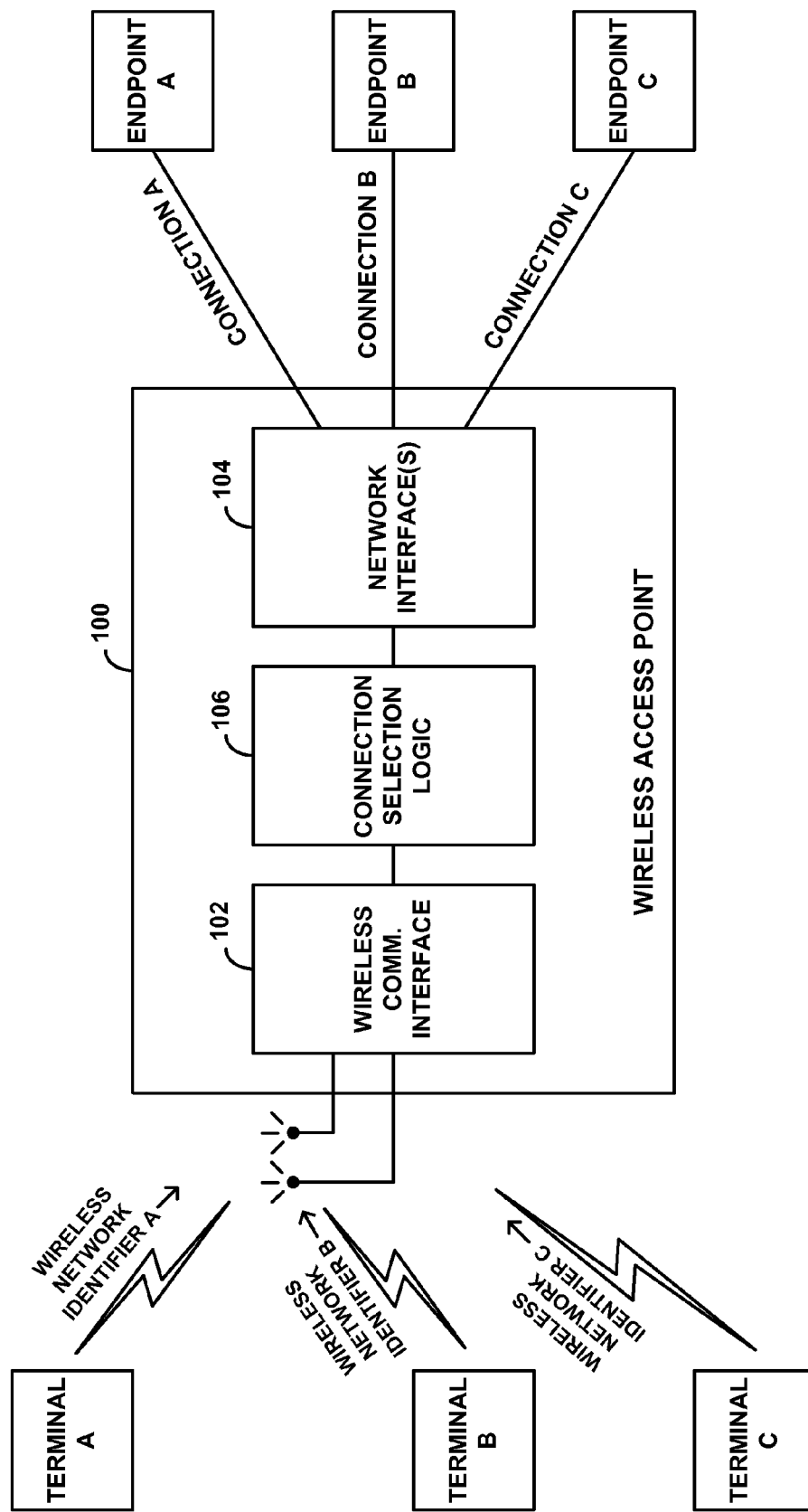
FIG. 1 is a block diagram generally depicting an arrangement for implementing the exemplary embodiment.

Referring to the drawings, FIG. 1 is a block diagram of an arrangement for implementing an exemplary embodiment of the present invention. It should be understood, however, that this and other arrangements described herein are set forth for purposes of example only. As such, those skilled in the art will appreciate that other arrangements and other elements (e.g., machines, interfaces, functions, orders of functions, etc.) can be used instead, and some elements may be omitted altogether. Further, many of the elements described herein are functional entities that may be implemented as discrete or distributed components or in conjunction with other components, and in various suitable combinations and locations.

Additionally, various functions described herein as being performed by one or more entities may be carried out by hardware, firmware and/or software logic. For instance, various functions may be carried out by a processor (i.e., one or more processors) executing a set of machine language instructions stored in memory. Provided with the present disclosure, those skilled in the art can readily prepare appropriate computer instructions to perform such functions.

Shown at the core of FIG. 1 is a wireless access point 100, which functions as a bridge between an air interface and one or more networks. More particularly, the exemplary access point 100 includes a wireless communication interface 102, through which the access point communicates over an air interface, and one or more network interfaces 104, through which the access point can be physically coupled to one or more communication networks.

Through the wireless communication interface 102, the access point 100 can communicate over an air interface with one or more wireless terminals according to an agreed WLAN protocol, such as 802.11, an 802.11-variant, Bluetooth or HomeRF, for instance. FIG. 1 shows three exemplary terminals, labeled terminal A, terminal B and terminal C. However, there could be more or fewer terminals.

Generally speaking, each terminal is able to communicate over the air interface with the access point according to the agreed protocol. Beyond that, each terminal can take various forms. For instance, an exemplary terminal could be an 802.11b-equipped portable computer, personal digital assistant (PDA), telephone, and it could be equipped to communicate various sorts of data, such as bit streams representing voice, video or other real-time media, text, or other information.

The one or more network interfaces 104 (shown in FIG. 1, by way of example, as a single block), can also take various forms. Generally speaking, each network interface provides a port of some sort for coupling with a network, and the network could range in form from a complex packet-switched network (such as a LAN and/or the Internet, for instance) to a simple point-to-point link (such as a T1 or fiber link, for instance). Examples of network interfaces include, without limitation, an RJ-45 port, an RJ-11 port, a cable port, a fiber port, and a wireless interface. Thus, the access point 100 could be coupled with a network through various channels, such as an Ethernet cable, a telephone line, a coaxial cable, a fiber optic cable or a wireless link, for instance. Other examples are also possible.

In accordance with the exemplary embodiment, after the access point is coupled via the one or more network interfaces with the one or more communication networks, multiple connections will exist from the access point over the one or more communication networks. And each connection will extend from the access point to a respective remote endpoint. These multiple connections may include physical connections, which could simply be the communication networks themselves, so that multiple physical connections could exist by the act of coupling the access point to multiple communication networks. Alternatively or additionally, the connections may include logical connections, such as VPN tunnels, which the access point could be arranged to establish over the one or more communication networks with respective remote VPN terminators.

FIG. 1 depicts three exemplary connections, labeled connection A, connection B and connection C, which extend respectively to endpoints labeled endpoint A, endpoint B and endpoint C, each of which could sit on a respective remote network or could be discrete termination points. However, there could be more or fewer connections. Some or all of connections A, B and C could be physical connections, such as discrete communication networks or physical communication pathways. Further, some or all of connections A, B and C could be discrete logical connections, such as VPN tunnels, which may or may not extend over a common network, such as LAN and the Internet, for instance.

Given that multiple connections will exist from the access point, the access point 100 will further include connection-selection logic (or a "connection manager") 106, to be able to determine which of the connections should carry a communication that the access point receives from a terminal via the wireless communication interface 102. In the exemplary embodiment, the connection-selection logic 106 operates by detecting (e.g., reading or otherwise learning) a wireless-network identifier provided by the communicating terminal via the wireless communication interface 102 and correlating that wireless-network identifier with a particular one of the connections. (While the selection of a connection will be based on the wireless-network identifier, note that the selection can additionally be based on one or more other factors.)

As a general matter, a wireless-network identifier is an identifier of a wireless network and can function to distinguish one wireless network from another. In a WLAN, the wireless-network identifier may be an SSID, which could distinguishes one WLAN from another. Under 802.11b, for instance, all devices in a given WLAN would be programmed with a common SSID as a wireless-network identifier. Thus, when a wireless terminal attempts to associate with an 802.11b access point so as to wirelessly connect with a communication network via the access point, the terminal may conventionally send an SSID in an access request to the access point, and the access point may validate the SSID and allow access. Thereafter, as the terminal communicates via the access point, the terminal will typically include the SSID in packet headers, reflecting the fact that the terminal and access point are communicating with each other over a particular wireless network. Other wireless-network identifiers are possible as well.

In the exemplary embodiment, connection-selection logic 106 may take the form of hardware, firmware and/or software that can be applied by access point 100 (e.g., executed by a processor) to correlate a wireless-network identifier with one of the available connections, so that the access point may then route communications from the terminal over that connection. Thus, for instance, the connection-selection logic 106 can include mapping data that correlates wireless-network identifiers (e.g., SSIDs) with the available connections (established connections, or connections that can be established). And the connection-selection logic 106 could be applied by the access point to refer to that data so as to determine which connection to use in a given instance. (Note also, that access point 100 could be arranged to establish a given connection in response to a particular wireless-network identifier.)

With this arrangement, the access point can conveniently route traffic from different wireless terminals over different connections, if the wireless terminals use different wireless-network identifiers. For instance, as shown by way of example in FIG. 1, terminal A may send a wireless-network identifier A to the access point, and connection-selection logic 106 may correlate that wireless-network identifier with connection A to endpoint A. Thus, the access point may route traffic from terminal A over connection A. Terminal B, in contrast, may send a wireless-network identifier B to the access point, and connection-selection logic 106 may correlate that wireless-network identifier with connection B to endpoint B. Thus, the access point may route traffic from terminal B over connection B. And terminal C may send a wireless-network identifier C to the access point, and connection-selection logic 106 may correlate that wireless-network identifier with connection C to endpoint C. Thus, the access point may route traffic from terminal C over connection C.

Alternatively, it is possible that multiple wireless-network identifiers could correlate with a common connection, and it is possible that multiple connections could correlate with a common wireless-network identifier. Further, it is possible that multiple terminals could use a common wireless-network identifier, or all of the terminals could use distinct wireless-network identifiers.

Figure 2:
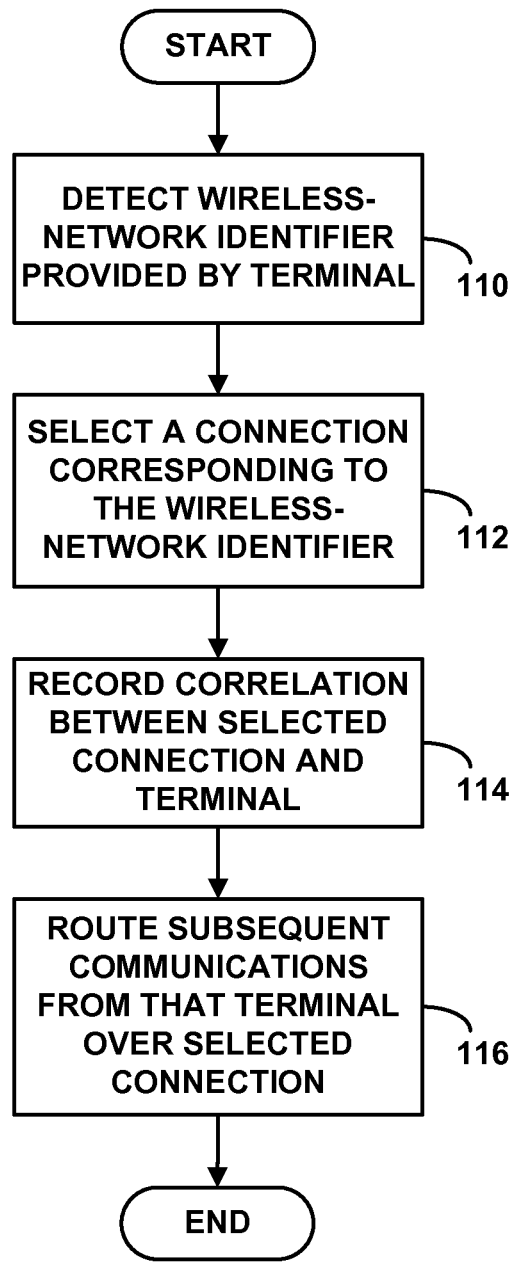
FIG. 2 is a flow chart depicting functions that can be involved in advanced selection of a connection from a WLAN access point, in accordance with the exemplary embodiment.
Figure 3:
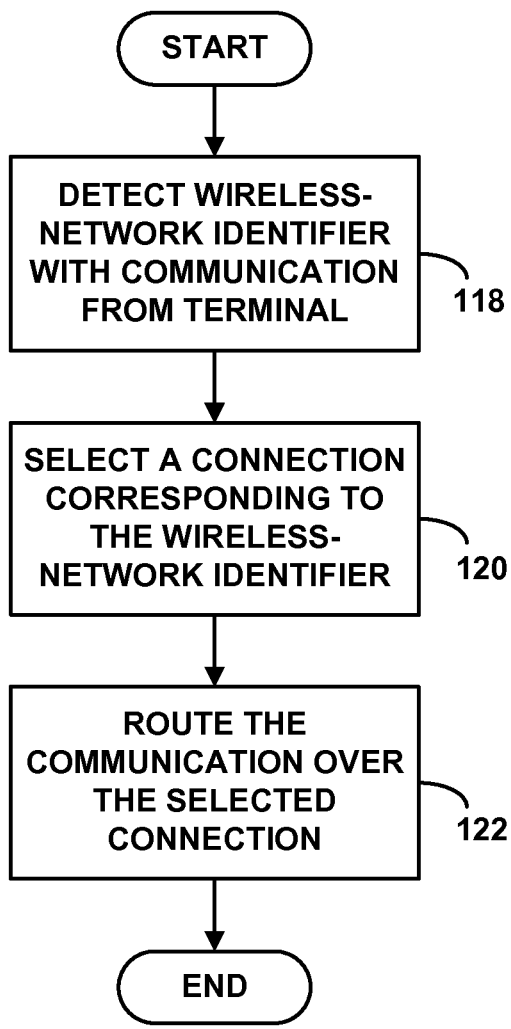
FIG. 3 is a flow chart depicting functions that can be involved in more dynamic selection of a connection from a WLAN access point, in accordance with the exemplary embodiment.

FIGS. 2 and 3 are flow charts depicting examples of how this process could work in practice, though it should be understood that variations on these examples are possible. FIG. 2 illustrates a process of advanced-selection of a connection. And FIG. 3 illustrates a process of more dynamic selection of a connection. Both of these figures assume that multiple connections have been established from the access point via network interface(s) 104.

Referring first to FIG. 2, at block 110, access point 100 detects a wireless-network identifier provided by a terminal in an access request. At block 112, the access point then refers to correlation data so as to determine which connection corresponds to the wireless-network identifier. An at block 114, the access point records a correlation between that connection and the terminal. (For instance, if the access request also specifies a hardware address (such as a MAC address) of the terminal, then the access point could record in memory a correlation between that hardware address and the selected connection.) Thereafter, at block 116, when the access point receives a communication from the terminal, the access point routes the communication over the selected connection. (For instance, the access point could refer to a packet header to determine the communicating terminal's hardware address and could match that hardware address to the selected connection.)

Referring next to FIG. 3, at block 118, the access point 100 detects a wireless-network identifier provided with a communication from a wireless terminal, such as in a packet header. At block 120, the access point then refers to correlation data so as to determine which connection corresponds to the wireless-network identifier. At block 122, the access point then routes the communication over that selected connection.

As one specific example, a communication that the access point routes over the selected connection could be a DHCP request. By allowing a DHCP request to pass through the access point from a terminal and over a selected connection to a respective endpoint, the terminal could acquire a network address (e.g., an IP address) routable on a respective remote network.

2. Example Application: Voice Access Point

The exemplary embodiment could be applied in practice to allow WLAN voice terminals, such as 802.11b-capable mobile phones, to engage in voice communication through call control services hosted by remotely located networks (e.g., private packet networks). In particular, each WLAN voice terminal could use a particular wireless-network identifier, which the access point can correlate with a respective VPN tunnel or other sort of connection to a remote telephony services network. And the access point can then forward a DHCP request from the terminal over the selected VPN tunnel to the remote network, so that the terminal can acquire an IP address routable on the remote network. Each voice terminal operating on the WLAN can then operate as a voice communication node on a respective remote network, via the access point.

In this arrangement, a specialized WLAN access point is provided as a "voice access point" (VAP) that can allow each wireless terminal (i) to securely communicate over a packet network (e.g., a public/shared packet network such as the Internet and/or a private packet network) with a remote network and (ii) to make use of a voice calling service on the remote network. For instance, the remote network might include a call control device (such as a PBX server, SIP proxy, IP telephony gateway, etc.) coupled with a voice transport network (such as the PSTN, the Internet and/or the remote network), and the wireless terminal may interact with the call control device through a communication path comprising (i) a WLAN air interface link between the wireless terminal and the VAP, (ii) a virtual private network (VPN) tunnel over the packet network, between the VAP and a VPN terminator on the remote network, and (iii) the remote network. In this way, the wireless terminal could operate as a telephony node on the remote network, to securely place and receive calls over the voice transport network via the call control device.

Conveniently, an exemplary VAP may include an integrated VPN client that is pre-configured to establish a plurality of VPN tunnels, each with a respective VPN terminator on a given remote network, so as to allow suitably equipped wireless terminals to interact with a call control devices on those remote networks. For instance, the VAP could be provisioned with security parameters that enable it to engage in both mutual authentication and session key exchange with each VPN terminator, and the VAP could be programmed to use those security parameters to establish VPN sessions with the VPN terminators.

An exemplary wireless terminal may then be configured in advance with data and logic that enables the wireless terminal to establish a WLAN association with the VAP and that enables the wireless terminal to gain access to one of the VPN tunnels established by the VAP (and thereby to gain access to the remote network). For instance, the wireless terminal might be programmed to use a particular SSID (or other wireless-network identifier) to associate with the VAP and to specify that SSID in WLAN communications that the wireless terminal sends to the VAP. And the VAP might be programmed to correlate that SSID with a VPN tunnel to a particular remote network, so that, as the VAP receives voice traffic from the wireless terminal, the VAP routes the voice traffic over that VPN tunnel. Further, the wireless terminal and VAP can be configured to employ wired equivalent privacy (WEP) or some other security measure to safeguard the WLAN communications.

A suitably equipped wireless terminal could then establish a WLAN association with the VAP and, through the VPN tunnel corresponding to its wireless-network identifier, acquire a network address routable in a remote network. Provided with the network address, the wireless terminal can then readily engage in voice over packet (VoP) communications with the call control device in the remote network, and the call control device can interface those voice communications with the voice transport network.

Advantageously, this arrangement can allow multiple VoP telephony providers to readily serve WLAN telephony devices. A building owner or enterprise, for instance, could acquire and install a VAP on a LAN or other network, and the VAP could be configured in advance (or later provisioned) to establish VPN tunnels to multiple telephony service networks. WLAN voice terminals configured with suitable wireless-network identifiers could then gain access to corresponding telephony service networks.

Figure 4:
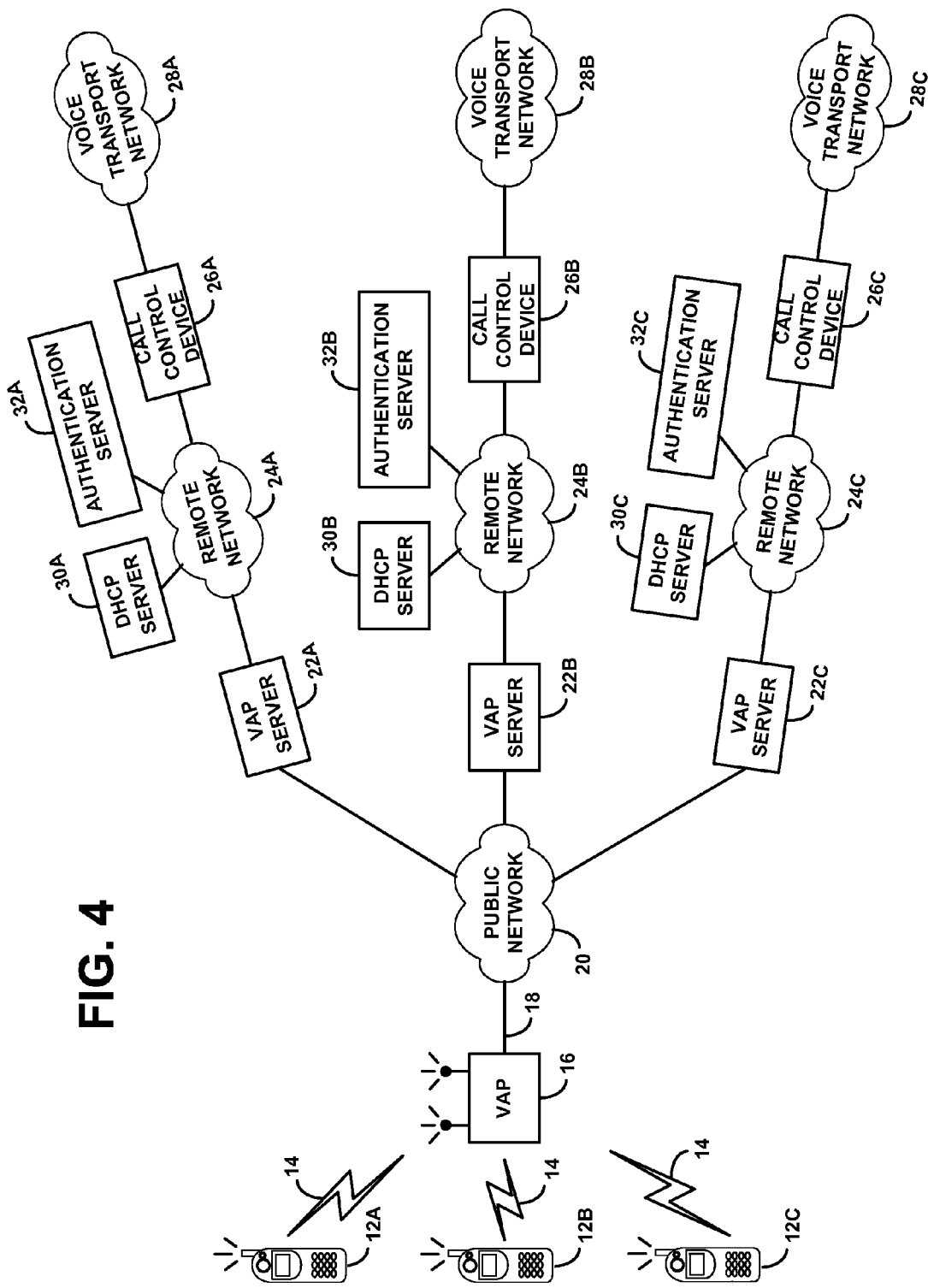
FIG. 4 is a block diagram of an arrangement for implementing a voice access point in accordance with the exemplary embodiment.

FIG. 4 is a simplified block diagram illustrating an arrangement for implementing a VAP in this manner. The arrangement shown in FIG. 1 includes wireless terminals 12a, 12b and 12c, each of which communicates wirelessly over an air interface 14 with a VAP 16. The VAP 16 is then coupled by one or more communication links 18 with a public packet network 20 (and/or a private network) that provides access to multiple VAP servers 22a, 22b, 22c, each residing on a respective remote network 24a, 24b, 24c. Also sitting on each remote network is a call control device 26a, 26b, 26c that provides connectivity with a voice transport network 28a, 28b, 28c, a dynamic host control protocol (DHCP) server 30a, 30b, 30c that functions to assign network addresses (e.g., IP addresses) for use in the remote network, and an authentication server 32a, 32b, 32c that functions to authenticate users seeking to access services of the call control device 26a, 26b, 26c.

Variations on this arrangement are possible. For example, although communication link 18 is shown as a direct line between VAP 16 and public network 20, the link 18 could be far more complex, including one or more network elements (such as a cable modem system, DSL system or home LAN) for instance. As another example, although the VAP server, call control device and DHCP server on each remote network are shown as discrete elements, they could be integrated together functionally on a single processing platform. And as yet another example, although each voice transport network is shown separate from the remote network and public network 20, it is possible that a voice transport network could coincide at least in part with these other networks (e.g., the voice transport network could be or include the remote network, the PSTN, and/or public packet network). Further, the multiple voice transport networks shown in FIG. 4 could be a common voice transport network. Other variations are possible as well.

In the example arrangement shown in FIG. 4, each wireless terminal 12a, 12b, 12c is a wireless terminal that is able to engage in WLAN communication over air interface 14 with an access point such as VAP 16 and to support VoP (e.g., voice-over-IP (VoIP)) network communications, so as to enable a user of the wireless terminal to engage in voice communication with a remote entity. As such, each wireless terminal may include components commonly found in commercially available WLAN voice terminals such as those made by Spectralink and Symbol Technologies, for instance.

In particular, to support WLAN communication with VAP 16, each wireless terminal can include components conventionally found in a WLAN station. For example, each wireless terminal can include a wireless transceiver, an antenna, and logic to transmit and receive information in a suitable WLAN air interface format such as 802.11, an 802.11 variant (e.g., 802.11a, 802.11b, or later revisions), Bluetooth or HomeRF, for instance. (An exemplary wireless terminal could in fact be a multi-mode device, capable of interfacing with more than one type of air interface.)

According to the well known 802.11b standard, for example, each wireless terminal could be provisioned with an SSID that matches an SSID used by VAP 16, so that the wireless terminal 12 can associate with VAP 16, wirelessly communicate with VAP 16 and engage in network communication via VAP 16. In the exemplary embodiment, the SSID will correspond with one of the VPN tunnels that VAP 16 establishes with a VAP server. Further, each wireless terminal 12 can further include encryption logic, such as WEP to facilitate secure wireless communication with VAP 16.

To support VoP network communications, each wireless terminal can also include components conventionally found in a VoP terminal. For example, each wireless terminal can include voice interface components such as a microphone for receiving voice from a user and a speaker or earpiece for playing out voice to a user. And each wireless terminal can include conversion circuitry for converting analog voice signals to digital form and for converting digital voice signals to analog form, as well as a suitable codec (encoder/decoder), such as G.723.1, enhanced variable rate codec (EVRC) or the like, for compressing and decompressing digitized voice signals.

Additionally, each wireless terminal can include logic for packetizing and depacketizing digitized (e.g., compressed) voice signals and for communicating the packetized voice signals with a network entity such as call control device 26a, 26b, 26c. For instance, each wireless terminal may include a DHCP client for obtaining an IP address from a DHCP server such as DHCP server 30a, 30b, 30c, and a TCP/IP client for engaging in TCP/IP communications. And each wireless terminal may include logic such as a session initiation protocol (SIP) user agent or H.248/H.323 client application, for setting up a VoP communication session with or through a remote entity such as call control device 26a, 26b, 26c, as well as logic such as a real-time transport protocol (RTP) client application, for communicating real-time VoP traffic.

Further, in the exemplary embodiment, each wireless terminal may include components that allow a user to place and receive voice calls, as a telephone. For instance, each wireless terminal may include a telephone keypad to allow a user to dial a phone number (which the wireless terminal might send as a SIP INVITE to a call control device so as to originate a call to that number), as well as logic to alert the user when there is an incoming call (e.g., in response to a SIP INVITE received from the call control device).

An exemplary VAP 16 can also take various forms. As a general matter, at its core, an exemplary VAP 16 will be a wireless access point, which (i) can engage in WLAN communication with one or more wireless terminals via air interface 14 and (ii) can engage in packet communication via link 18 and over public network 20. As such, VAP 16 can include components commonly found in commercially available wireless access points, such as those manufactured by Linksys, D-Link and 3Com Corporation for instance. Further, in accordance with the exemplary embodiment, VAP 16 preferably includes VPN client logic with multiple sets of pre-defined security settings, so that, when VAP 16 is coupled with link 18, VAP 16 can establish multiple VPN tunnels over public network 20, with VAP servers 22a, 22b, 22c for instance.

Figure 5:
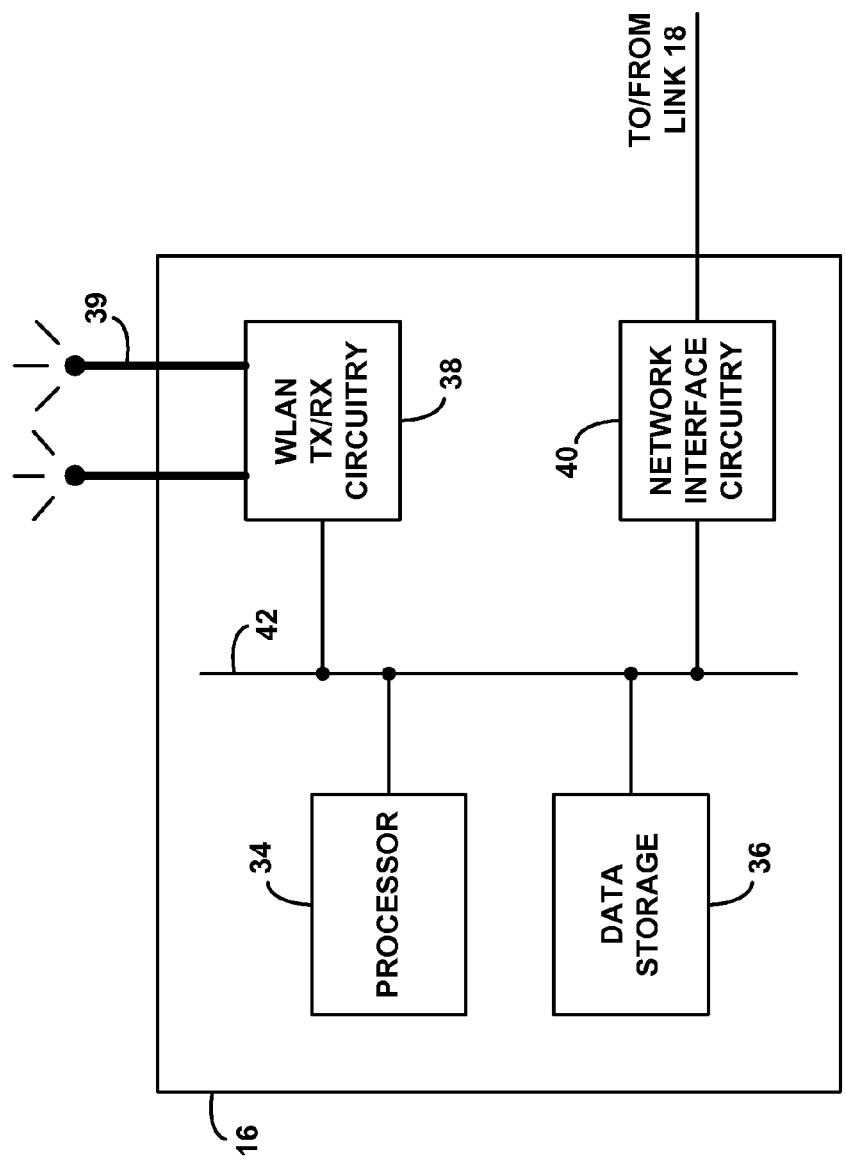
FIG. 5 is a block diagram of an exemplary voice access point.

FIG. 5 is a generalized block diagram of an exemplary VAP 16, showing some of the components that the VAP could include in accordance with the exemplary embodiment. As illustrated, the exemplary VAP 16 may include a processor 34, data storage 36, WLAN transmit/receive circuitry 38, and network interface circuitry 40, all of which could be linked together by a system bus 42 or other means within a VAP housing (e.g., injection molded plastic, not shown).

Generally speaking, WLAN transmit/receive circuitry 38 will operate in conjunction with one or more antennas 39, to provide a physical link via air interface 14 with wireless terminals 12a, 12b, 12c (and/or other wireless terminals operating in the coverage area of the VAP). Suitable arrangements for this sort of circuitry and antennas are well known in existing wireless access points and may vary depending on the air interface protocol used. Example air interface protocols, as noted above, could include 802.11, an 802.11 variant, Bluetooth or HomeRF, for instance. Currently, 802.11b or 802.11a is preferred. Further, like the wireless terminals, VAP 16 could be a multi-mode device, capable of operating on more than one air interface protocol.

Network interface circuitry 40, in turn, functions to provide a physical connection to link 18. Thus, the network interface circuitry 40 could take various forms depending on the form of link 18. For instance, network interface circuitry 40 could be, or could include, an Ethernet network interface card (NIC)

and port, a cable modem and coaxial cable port, and/or a DSL modem and RJ-11 port. Other examples are also possible.

Data storage 36 may include volatile and nonvolatile portions and preferably contains both program logic and reference data, and processor 34 may execute the program logic and refer to the reference data in order to carry out various functions.

For example, in order for VAP 16 to establish and carry on WLAN communication with the wireless terminals, data storage 36 may include WLAN logic. According to 802.11 protocols, for instance, each wireless terminal could associate with an access point such as VAP 16 through communication of an agreed SSID, and the wireless terminal may then include the SSID in communications that it sends to the access point. In accordance with the exemplary embodiment, data storage 36 could contain data indicating multiple acceptable SSIDs for this purpose, and data storage 36 can include program logic executable by processor 34 to allow a wireless terminal to associate, and to receive from the wireless terminal WLAN communications that bear one of the acceptable SSIDs. Additionally, the data storage 36 can include encryption logic (e.g., WEP logic) to facilitate secure wireless communication with wireless terminal 12.

Further, in accordance with the exemplary embodiment, VAP 16 may be configured to allow DHCP passthrough. That way, when a wireless terminal such as wireless terminal 12a, 12b, 12c sends a DHCP request, the VAP 16 can allow the request to pass through the VPN tunnel corresponding to the SSID that the wireless terminal used, and a DHCP server on the remote network could assign an IP address to the wireless terminal.

As another example, in order for VAP 16 to be able to engage in network communications with VAP servers 22a, 22b, 22c, data storage 36 may include a TCP/IP client application and may contain an indication of an IP address assigned statically or dynamically to the VAP 16. The IP address could be a simple IP address or a mobile IP address, and, in the exemplary embodiment, it could be assigned by a DHCP server communicatively linked with VAP 16.

And as yet another example, in order for VAP 16 to establish the VPN tunnels with VAP servers 22a, 22b, 22c as noted above, data storage 36 may contain predefined sets of VPN security setting as well as logic operable by processor 34 to establish the VPN tunnels. The process of establishing each VPN tunnel could take various forms, depending on requirements of the respective VAP servers for instance. Therefore, the particular parameters that make up each predefined set of VPN security settings could also take various forms.

For instance, a set of VPN security settings in data storage 36 for establishing a VPN tunnel between VAP 16 and VAP server 22a might include (i) a network address (e.g., IP address) or host name of VAP server 22a, (ii) a digital certificate (or identifier or shared secret) to send to the VAP server when presented with a challenge, (iii) definitions of encryption algorithms (e.g., IPSec, GRE, L2F, PPTP, L2TP) and key sizes that the VAP 16 supports, and (iv) a certificate or key that can enable VAP 16 to validate a digital certificate received from VAP server 22a. And the logic operable by processor 34 could define a conventional Internet Keyword Exchange (IKE) process, through which the VAP 16 and the VAP server 22a can agree on an encryption algorithm, key size, and key value to use for encryption/decryption of packet traffic.

In the exemplary embodiment, data storage 36 could thus contain multiple defined sets of VPN security settings, and each set could correspond with (i) a particular VAP server (on a particular remote network) and (ii) a particular SSID that a wireless terminal could use to associate with VAP 16 and when communicating with VAP 16 via WLAN air interface 14. This way, a wireless terminal that uses a given SSID may communicate through a given VPN tunnel from VAP 16 to a given VAP server on a given remote network, and the wireless terminal may thereby access a call control device on that given remote network. And at the same time, another wireless terminal that uses another SSID may communicate through another VPN tunnel from the same VAP 16 to another VAP server on another remote network, and the other wireless terminal may thereby access a call control device on that other remote network.

In line with the discussion above, to correlate sets of VPN security settings with SSIDs, data storage 36 could simply include a translation table, which indicates which set of security settings, and/or which resulting VPN tunnel, should be used for transmission of data that came over WLAN air interface in connection with a given SSID. And to correlate sets of VPN security settings with VPN tunnels, each set could inherently designate the endpoint VAP server.

It should be understood, however, that in an alternative arrangement, VAP 16 could have just a single set of VPN security settings, to establish a single VPN tunnel. And VAP 16 could then have one or more other connections in addition to that VPN tunnel.

In the exemplary embodiment, the multiple sets of VPN security settings that are contained in data storage 36 are preferably in data storage 36 before the VAP 16 is obtained by an end-user, so that the end-user does not need to learn the security settings and does not learn the security settings (beneficially, if the settings are confidential), and so that the VAP 16 can readily establish VPN tunnels after the VAP 16 is connected with link 18 to the public packet network 20. For instance, during manufacture of the VAP 16, the settings could be hard coded into logic circuitry (e.g., firmware) or stored in non-volatile memory (e.g., ROM) in the VAP 16. Or a manufacturer or other distributor of the VAP 16 could otherwise program the settings into data storage 36 before distributing the VAP 16. (Alternatively, an end-user could program the settings into the VAP 16, e.g., through a web-based interface, for instance.)

According to the exemplary embodiment, the VPN-establishment logic could cause the processor 34 to establish VPN tunnels with VAP servers 22a, 22b, 22c (or a particular one of those tunnels) in response to various triggering events. For instance, the processor could establish a VPN tunnel to VAP server 22a in response to connection of the VAP 16 to link 18. To facilitate this, after the VAP 16 is powered up, the processor could execute logic that causes it to periodically check if a connection exists, such as by pinging VAP server 22a, for instance. Once it determines that a connection exists, it may then use its defined security settings to establish a VPN tunnel. Alternatively, the logic could cause the processor to establish the VPN tunnel in response to a wireless terminal associating with the VAP 16 (e.g., sending an access request to the VAP). As noted above, then, it is further possible that the SSID used by the terminal could correlate with a particular set of VPN security settings, so the processor could use that particular set so as to establish a VPN tunnel to carry voice communications from that wireless terminal to a remote network. Further, the logic could cause the processor to periodically refresh the tunnel, so as to prevent a timeout. Other arrangements are also possible.

In turn, data storage 36 may contain logic executable by processor 34 (i) to tunnel VoP traffic (i.e., VoP bearer packets and VoP signaling packets) from a wireless terminal over a selected VPN tunnel to a VAP server 22a, 22b, 22c, for transmission over remote network 24a, 24b, 24c, and (ii) to receive VoP traffic via the VPN tunnel from a VAP server 22a, 22b, 22c and to pass the VoP traffic via the WLAN air interface 14 to the terminal. In this regard, as noted above, VoP traffic arriving over air interface 14 may come with an SSID or other parameter that signals to the processor 34 that the traffic should be sent over a particular VPN tunnel that terminates at a particular VAP server, so processor 34 may send that traffic over that VPN tunnel to that VAP server. And VoP traffic arriving over the VPN tunnel destined for the wireless terminal will come with a destination IP address of the wireless terminal, which the processor 34 could transmit over WLAN air interface 14 as broadcast packet data, for receipt by the wireless terminal.

Further, in the exemplary embodiment, data storage 36 may include packet filtering logic executable by the processor to restrict outbound VPN-tunnel communications to voice traffic, such as VoP traffic for instance (or to some other type of traffic). This logic could operate in a variety of ways. As an example, VoP traffic from a wireless terminal could carry a VoP identification parameter in a predefined header or payload position, and processor 34 could note that parameter and responsively send the traffic along the VPN tunnel. For instance, if the wireless terminal uses SIP to set up a VoP session with the remote call control device, processor 34 could look at the SIP messages that flow between the wireless terminal and the call control device, and could (i) see that the messages concern a VoP session and (ii) learn a session ID being used for the VoP session. When VAP 16 then receives packets bearing that session ID (or other related signaling packets), the processor can route those packets over the VPN tunnel, and the processor could drop (bar) or route locally any other packets. Alternatively, the wireless terminal could mark all VoP packets as voice traffic, specifically in order to tell the VAP 16 that the packets should be sent over the VPN tunnel. And again, other variations are possible.

Figure 6:
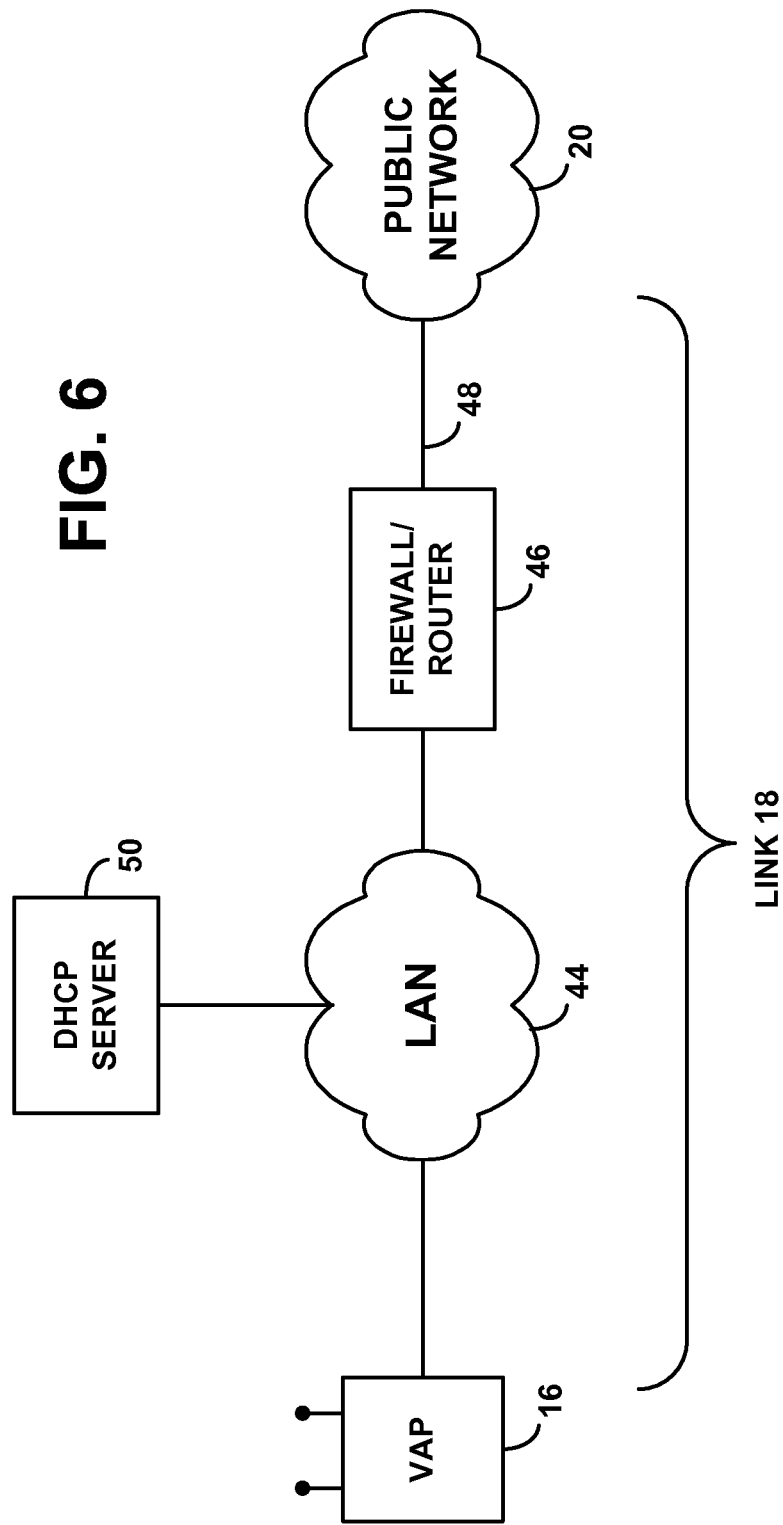
FIG. 6 is a block diagram of a link between the exemplary voice access point and a public network such as the Internet.

Continuing with reference to FIG. 4, link 18 between VAP 16 and the public network 20 could also take various forms, as suggested above. For example, the link could be a direct or point-to-point link. And as another example, the link can include a LAN or other sort of distribution system that provides connectivity between VAP 16 and the public network 20. FIG. 6 depicts one such arrangement, by way of example.

As shown in FIG. 6, link 18 could include a LAN 44 (or, more generally, any public or private network) coupled with a firewall/router 46 that provides connectivity over a link 48 with public network 20. Firewall/router 46 could be a conventional LAN router, and the firewall function could be a NAT function for instance. And link 48 could be a T1 line, cable modem system, DSL system, or any other suitable link.

Further, sitting separately on LAN 44, or perhaps integrated as part of firewall/router 46, is a DHCP server 50 that functions to assign network addresses within a domain of the LAN 44. Thus, when VAP 16 powers up on LAN 44, or at another time, VAP 16 can acquire a local network address from DHCP server 50, which VAP 16 can then use to communicate in the LAN 44. And firewall/router 46 might translate between that local network address and a public network address routable on public network 20. Alternatively, VAP 16 could have a global network address routable on network 20.

Turning back to FIG. 4, public network 20 can also take various forms. In the exemplary embodiment, for instance, the public network 20 would be the Internet. However, it could take other forms as well. (Further, it can alternatively be a private network.)

And each VAP server 22a, 22b, 22c can similarly take various forms. As a general matter, an exemplary VAP server will function as a VPN terminator for terminating VPN tunnels from VAPs such as VAP 16, and will further function as a firewall to protect the remote network on which the VAP server sits. Alternatively, these functions could be split into two separate devices, namely, a VPN terminator and a firewall. Such VPN terminators and firewalls, as well as combination VPN terminators/firewalls are commercially available from companies such as 3Com, Cisco and Symantec, for instance.

Next, each remote network 24a, 24b, 24c could also take various forms. By way of example, a remote network can be a private local, metropolitan or wide area packet network operated by any sort or entity. For instance, the remote network could be an enterprise LAN that normally functions to interconnect employees of the enterprise when the employees are at work. Or the remote network could be a telecommunication carrier's core signaling or transport network, such as the type of network that an interexchange carrier might use to route calls between local exchange carriers, for instance. Other examples are also possible. Further, the remote networks could alternatively be a common network, perhaps divided into subnetworks.

Each remote network 24a, 24b, 24c is designated as a "remote" network because in most cases it will span an area that is physically remote from VAP 16, separated by public network 20. However, it is equally possible that the remote network could be close to or coincident with the location of the VAP 16 in certain implementations.

In the exemplary embodiment, each DHCP server 30a, 30b, 30c on a remote network 24a, 24b, 24c functions to assign network addresses dynamically to devices via DHCP. Thus, for instance, a wireless terminal 12a, 12b, 12c can send a DHCP request, which passes through VAP 16 to a VAP server 22a, 22b, 22c, and which the VAP server routes to DHCP server 30a, 30b, 30c as a default DHCP server for remote network 24a, 24b, 24c. In the exemplary embodiment, the DHCP server then assigns an IP address to wireless terminal. Further, in the exemplary embodiment, each DHCP server also includes in its DHCP response an indication of the IP address of the call control device 26 on the remote network served by the DHCP server, so that the wireless terminal will know where to find the call control device 26 so as to be able to initiate a voice call. Although each DHCP server 30a, 30b, 30c is shown separate from VAP sever 22a, 22b, 22c on a given remote network, the DHCP server could instead be a function of VAP server.

Each authentication server 32a, 32b, 32c, in turn, functions to authenticate user/device credentials and to supply call control device 26a, 26b, 26c with telephony profiles that define telephony services authorized for use by given user/device. To carry out this function, each authentication server 32a, 32b, 32c could be a RADIUS server and could include or have access to a user profile database (not shown) and/or other reference data and logic. The user profile database and/or other reference data could be distributed for scalability and redundancy.

In turn, each call control device 26a, 26b, 26c can also take various forms and could in fact be made up of one or more devices or other components. As a general matter, an exemplary call control device 26a, 26b, 26c will function to interface between remote network 24a, 24b, 24c and voice transport network 28a, 28b, 28c. Thus, for instance, if remote network 24a is a packet network (e.g., an Ethernet LAN) and voice transport network 28a is a circuit-switched telephony network such as the PSTN, then call control device 26a may function to bridge a VoP communication over remote network 24a with a circuit-switched voice call over voice transport network 28a. Or if remote network 24a is a packet network and voice transport network 28a is also a packet network, call control device 26a may function to bridge VoP communication over remote network 24a with VoP communication over voice transport network 28a. Devices capable of doing this are commercially available. Examples include intelligent voice gateways, computer telephony interfaces, IP-PBXs, switches, proxy servers, media gateway controllers, and internet telephony gateways.

Each exemplary call control device 26a, 26b, 26c will include a processor and data storage, and the data storage will contain program instructions and reference data to facilitate carrying out the call control function. For example, the data storage may include a translation table that correlates (i) a VoP session with a wireless terminal 12a, 12b, 12c with (ii) a call over a voice transport network 28a, 28b, 28c. Further, the data storage may include a local copy of user profiles that define telephony services authorized for use by each wireless terminal and/or by a user of each wireless terminal, such as limits on the types of calls that the user can place or receive, for instance.

In the exemplary embodiment, after a wireless terminal acquires an IP address on a remote network, the wireless terminal may register with the call control device (through any agreed registration scheme) on that network, and the call control device may responsively query the authentication server on that network to validate the wireless terminal (or the user of the terminal). Alternatively or additionally, the call control device could query the authentication server each time an effort is made to place a voice call to or from wireless terminal. Upon successful authentication, the authentication server may send a service profile to the call control device, which the call control device can then store and use when providing service for the wireless terminal.

Further, the call control device on a given remote network may have a relationship with DHCP server on that network, so that the call control device can determine the network address assigned to wireless terminal when a call for the wireless terminal comes into the call control device from the voice transport network. (For instance, DHCP server 30a could programmatically report a wireless terminal's IP address to the call control device 26a when DHCP server 30a assigns the address.)

Finally, each voice transport network 28a, 28b, 28c can also take various forms. As noted above, for instance, each voice transport network could be a packet-switched network, such as the Internet. Or each voice transport network could be a circuit-switched network such as the PSTN. Alternatively, each voice transport network could include both packet-switched and circuit-switched components.

Further, as noted above, each voice transport network could be part of the remote network, or vice versa. For instance, remote network 24a could ordinarily function to carry VoP communications between entities on the remote network 24a, and call control device 26a could function as a controller for those voice calls, as an IP-PBX server for instance. Thus, a wireless terminal could place a voice call through VAP 16 to (or via) an entity on remote network 24a and could receive a voice call through VAP 16 from an entity on remote network 24a.

Referring next to FIGS. 7-10, several flow charts are provided to help illustrate how this example arrangement can operate in practice. It should be understood, however, that many variations on the processes illustrated are possible.

Figure 7:
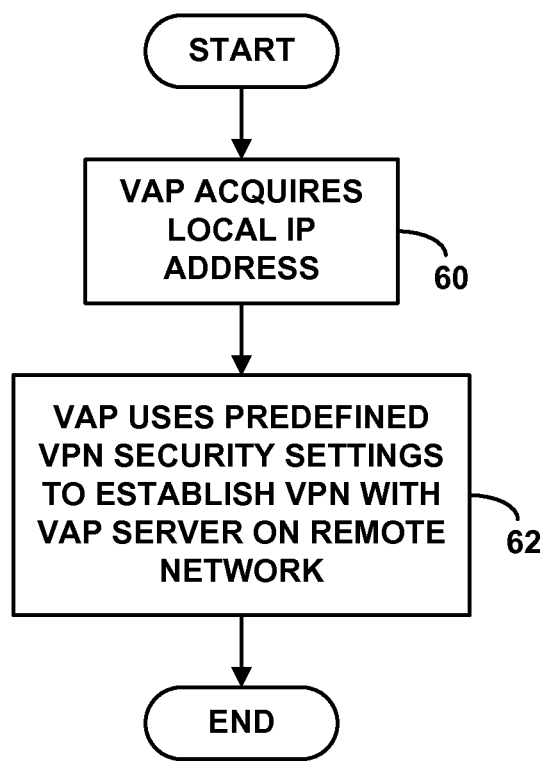
FIG. 7 is a flow chart depicting functions that can be involved in initiating a voice access point according to the exemplary embodiment.

To begin with, FIG. 7 depicts functions that can be involved in initiating VAP 16, such as upon connection of VAP 16 to link 18 of FIG. 3. As shown in FIG. 4, at block 60, the VAP 16 may first acquire a local IP address, from DHCP server 50, so as to be able to communicate on LAN 44. And at block 62, once the VAP 16 has an IP address, it will use its predefined VPN security settings to establish VPN tunnels with VAP servers 22a, 22b, 22c.

Figure 8:
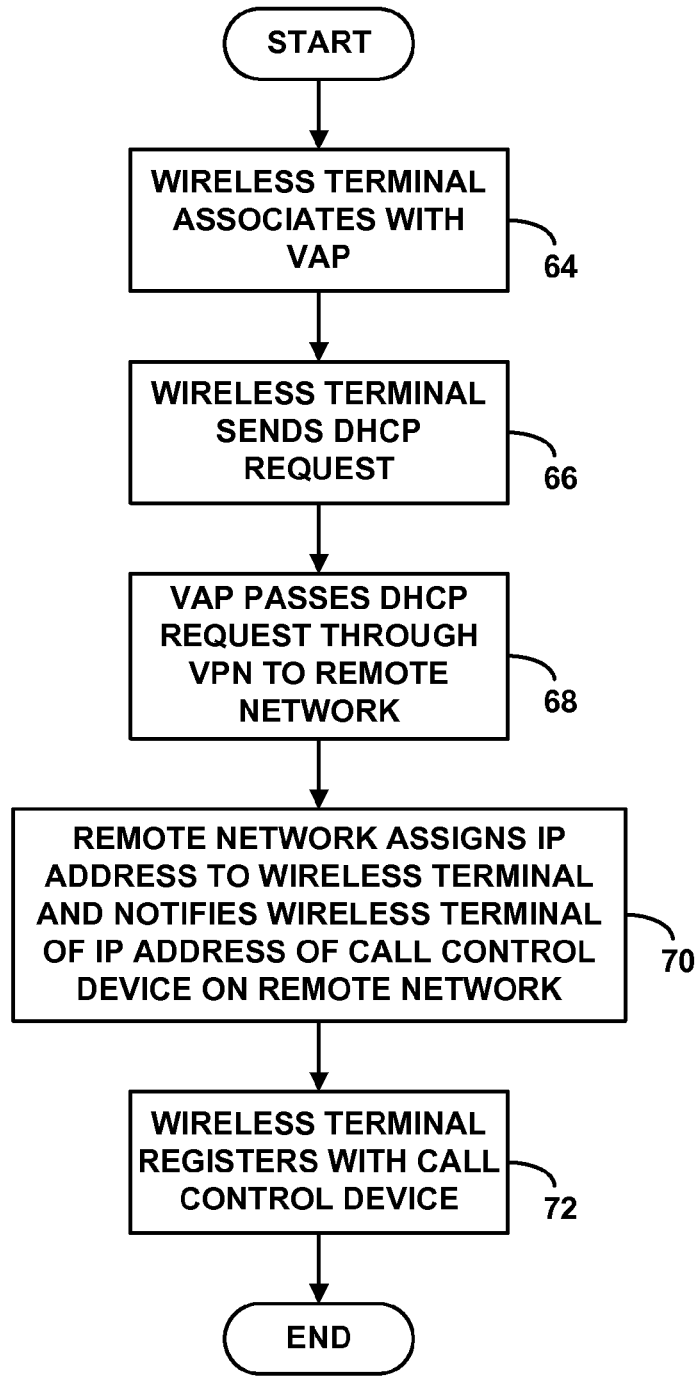
FIG. 8 is a flow chart depicting functions that can be involved in establishing a remote network link with a wireless voice terminal via a voice access point according to the exemplary embodiment.

FIG. 8 next depicts functions that can be involved in a wireless terminal establishing a network link with remote network 24. As shown in FIG. 8, at block 64, the wireless terminal will first associate with VAP 16 with a predetermined SSID, which the VAP will use as a basis to select one of the VPN tunnels. At block 66, once associated, the wireless terminal will send a DHCP request, seeking an IP address. In the exemplary embodiment, at block 68, the VAP 16 will allow that DHCP request to pass through the selected VPN tunnel to a VAP server on a remote network. And at block 70, the DHCP server on the remote network will issue an IP address to the wireless terminal and, in the exemplary embodiment, provide the wireless terminal with the IP address of the call control device on the remote network. At block 72, the wireless terminal will then register with that call control device.

Figure 9:
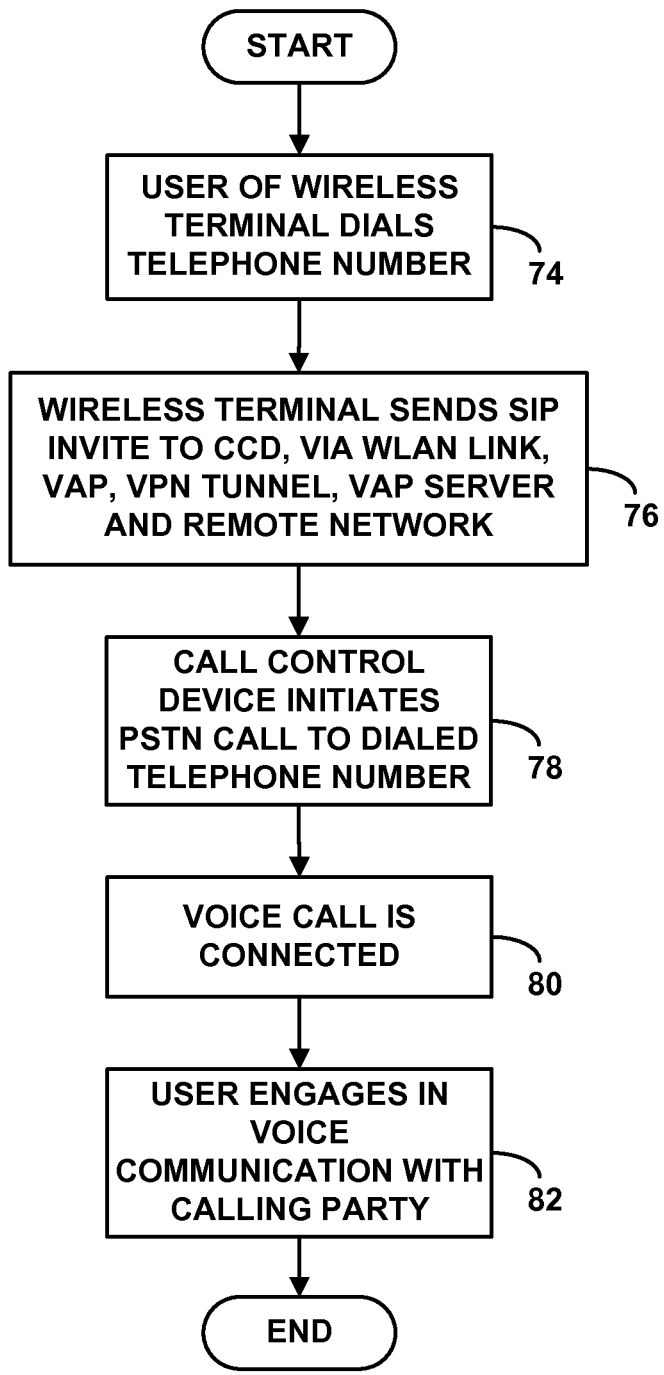
FIG. 9 is a flow chart depicting functions that can be involved in a wireless voice terminal placing a voice call via a voice access point according to the exemplary embodiment.

FIG. 9 next depicts functions that can be involved in placing a voice call from a wireless terminal to a telephone number on the PSTN. As shown in FIG. 9, at block 74, a user of the wireless terminal dials a telephone number and directs the wireless terminal to send the dialed digits to a call control device on the remote network in which the wireless terminal acquired an IP address.

At block 76, a SIP user agent client on the wireless terminal could then responsively generate and send a SIP INVITE message to the IP address of call control device, via a communication path comprising the WLAN air interface 14, the VAP 16, the selected VPN tunnel, the VAP server and the remote network. The SIP INVITE would indicate the dialed number within the INVITE message and seek to set up a VoP/RTP session with or through the call control device. And at block 78, the call control device then initiates a PSTN call to the dialed number.

At block 80, after additional signaling, the call is connected. And at block 82, a user of wireless terminal then engages in a voice call with the called party, during which voice is carried as VoP/RTP between the wireless terminal and the call control device and conventionally as a circuit-switched call over the PSTN.

Figure 10:
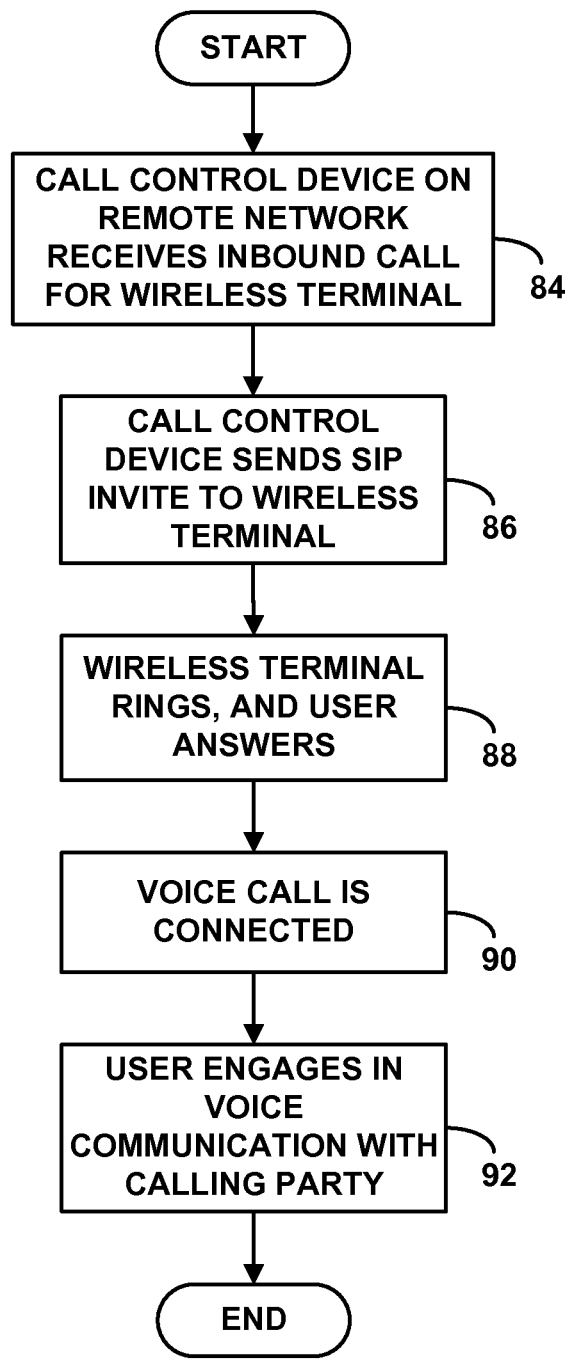
FIG. 10 is a flow chart depicting functions that can be involved in a wireless voice terminal receiving a voice call via a voice access point according to the exemplary embodiment.

Finally, FIG. 10 depicts functions that can be involved in connecting a voice call from the PSTN to a wireless terminal. As shown in FIG. 10, at block 84, a call control device receives an inbound call destined for a telephone number that the call control device associates with a wireless terminal. At block 86, the call control device responsively sends a SIP INVITE to the IP address of the wireless terminal, seeking to set up a VoP/RTP session with the wireless terminal. When a VAP server on the remote network sees the IP message, it then routes it over the applicable VPN tunnel to VAP 16, which transmits the message over WLAN air interface 14 to the wireless terminal.

At block 88, an application on the wireless terminal may responsively ring or otherwise alert a user of the wireless terminal, and the user may answer the call. At block 90, after additional signaling, the call is connected. And at block 92, a user of the wireless terminal then engages in a voice call with the calling party, during which voice is carried as VoP/RTP between the wireless terminal and the call control device and conventionally as a circuit-switched call over the PSTN.

3. Conclusion

An exemplary embodiment of the present invention has been described above. Those skilled in the art will understand, however, that changes and modifications may be made to this embodiment without departing from the true scope and spirit of the present invention, which is defined by the claims.

We claim:

1. A wireless local area network (WLAN) access point comprising:
   a wireless communication interface for wirelessly communicating with terminals over an air interface;
   at least one network interface for coupling with at least one communications network;
   virtual private network (VPN) client logic applicable by the access point to have a plurality of VPN tunnels over the at least one communication network; and
   tunnel-selection logic applicable by the access point to detect a service set identifier (SSID) that the access point receives from a given terminal via the wireless communication interface and, based on the SSID, to then select a corresponding one of the plurality of VPN tunnels,
   wherein the SSID is used to associate the given terminal with the access point for wireless communication between the given terminal and the access point, and
   wherein the access point sends at least one communication from the given terminal via the selected VPN tunnel.

2. The access point of claim 1, further comprising:
   data storage,
   wherein, in advance of the access point receiving the SSID from the given terminal, the data storage holds VPN security settings for establishing the plurality of VPN tunnels, and
   wherein the VPN client logic uses the VPN security settings to establish the plurality of VPN tunnels.

3. The access point of claim 2, wherein the VPN security settings include, for each VPN tunnel of the plurality of VPN tunnels, a network address of a respective remote VPN endpoint and a digital certificate for sending to the respective remote VPN endpoint.

4. The access point of claim 1, wherein the access point receives the SSID in an access request from the given terminal, and wherein the at least one communication comprises a given communication that the access point receives after the access request.

5. The access point of claim 1, wherein the access point sends the at least one communication from the given terminal via the selected VPN tunnel to a VPN terminator.

6. The access point of claim 1, further comprising a processor, wherein the tunnel-selection logic comprises machine language instructions executable by the processor.

7. The access point of claim 6, further comprising data storage, wherein the machine language instructions are stored in the data storage.

8. The access point of claim 1, wherein the access point communicates with the given terminal over the air interface according to a WLAN protocol.

9. The access point of claim 8, wherein the WLAN protocol is a protocol selected from the group consisting of 802.11, an 802.11-variant, Bluetooth, and HomeRF.

10. The access point of claim 1, wherein the at least one network interface comprises an interface selected from the group consisting of (i) an Ethernet network interface, (ii) a cable modem and coaxial cable port and (iii) a DSL modem and RJ-11 port.

11. The access point of claim 1, wherein
    the tunnel-selection logic is applicable by the access point to detect a first SSID that the access point receives from a first terminal via the wireless communication interface and to responsively select a first VPN tunnel corresponding with the first SSID, and
    the tunnel-selection logic is applicable by the access point to detect a second SSID that the access point receives from a second terminal via the wireless communication interface and to responsively select a second VPN tunnel corresponding with the second SSID,
    wherein the first SSID is different than the second SSID, and the first VPN tunnel is different than the second VPN tunnel.

12. The access point of claim 11, further comprising:
    data storage,
    wherein, in advance of the access point receiving the first SSID from the first terminal and the second SSID from the second terminal, the data storage holds first VPN security settings for establishing the first VPN tunnel and second VPN security settings for establishing the second VPN tunnel,
    wherein the VPN client logic uses the first VPN security settings to establish the first VPN tunnel, and the VPN client logic uses the second VPN security settings to establish the second VPN tunnel.

13. An access point comprising:
    a processor;
    a wireless communication interface for wirelessly communicating with terminals over an air interface;
    a network interface for coupling with a communications network;
    virtual private network (VPN) client logic executable by the processor to have a plurality of VPN tunnels over the communications network, each VPN tunnel extending from the access point to a respective remotely located VPN terminator;
    connection logic executable by the processor (i) to detect a first service set identifier (SSID) received from a first terminal over the air interface and, based on the first SSID, to select a first one of the VPN tunnels over which to send a first communication from the first terminal and (ii) to detect a second SSID received from a second terminal over the air interface and, based on the second SSID, to second a second one of the VPN tunnels over which to send a second communication from the second terminal,
    wherein the first SSID is different than the second SSID, and the first VPN tunnel is different than the second VPN tunnel, and
    wherein the first SSID is used to associate the first terminal with the access point for wireless communication between the first terminal and the access point, and the second SSID is used to associate the second terminal with the access point for wireless communication between the second terminal and the access point.

14. The access point of claim 13, wherein the access point communicates with the first and second terminals over the air interface protocol according to a wireless local area network (WLAN) protocol.

15. The access point of claim 14, wherein the WLAN protocol is a protocol selected from the group consisting of 802.11, an 802.11-variant, Bluetooth, and HomeRF.

16. The access point of claim 13,
    wherein the connection logic is executable by the processor to detect the first SSID in a first access request from the first terminal and to detect the second service SSID in a second access request from the second terminal,
    wherein the access point receives the first communication from the first terminal after receiving the first access request from the first terminal, and the access point receives the second communication from the second terminal after receiving the second access request from the second terminal.

17. A method comprising:
    an access point storing virtual private network (VPN) logic for having a plurality of VPN tunnels over at least one communication network;

the access point receiving a first service set identifier (SSID) from a first terminal via an air interface between the wireless access point and the first terminal, wherein the first SSID is used to associate the first terminal with the access point for wireless communication between the first terminal and the access point;

the access point responsively selecting from the plurality of VPN tunnels a first VPN tunnel corresponding with the first received SSID, and the access point sending over the selected first VPN tunnel at least one communication that the access point receives from the first terminal via the air interface;

the access point receiving a second SSID from a second terminal via an air interface between the wireless access point and the second terminal, wherein the second SSID is used to associate the second terminal with the access point for wireless communication between the second terminal and the access point;

the access point responsively selecting from the plurality of VPN tunnels a second VPN tunnel corresponding with the second received SSID, and the access point sending over the selected second VPN tunnel at least one communication that the access point receives from the second terminal via the air interface, wherein the first SSID is different than the second SSID, and the first VPN tunnel is different than the second VPN tunnel.

* * * * *